United States Patent

[11] 3,549,815

[72] Inventor Lucas Bruglemans
Antwerp, Belgium
[21] Appl. No. 751,865
[22] Filed Aug. 12, 1968
[45] Patented Dec. 22, 1970
[73] Assignee Automatic Electric Laboratories, Inc.
Northlake, Ill.
a corporation of Delaware

[54] MATRIX CONTROL SELECTION SYSTEM
4 Claims, 4 Drawing Figs.

[52] U.S. Cl. 179/18
[51] Int. Cl. H04q 3/42
[50] Field of Search 179/18BT, 18.74, 18.74A, 22Cursory

[56] References Cited
UNITED STATES PATENTS
3,382,324 5/1968 Shirasu et al. 179/18.7Y
3,443,034 5/1969 Schoenemeyer et al. 179/18BT

*Primary Examiner*—Kathleen H. Claffy
*Assistant Examiner*—William A. Helvestine
*Attorneys*—Spencer E. Olson, K. Mullerheim and B. E. Franz

ABSTRACT: A communication switching network having tandem coordinate matrices with a unique path arrangement wherein the interstage links include a break contact in the link test and operate conductors. These contacts are controlled by relays responsive to the busy condition of the link to maintain this test conductor open circuited. This relay may also be operated from the marker to open those paths of the matrix not required for potential completion of a connection to a particular terminal. These relays from each of the link paths in a particular interstage group are multipled into groups to facilitate the opening of the paths during the testing operation.

INVENTOR.
LUCAS BRUGLEMANS
BY Bernard E. Franz
ATTY.

MATRIX CONTROL SELECTION SYSTEM

BACKGROUND OF THE INVENTION

1. Field of the Invention

This invention relates to a crosspoint type switching system and more particularly to a multiplying and selection system in the crosspoint switching array.

2. Description of the Prior Art

The following described patents disclose crosspoint switching systems upon which the present invention is an improvement. They are hereby incorporated by reference and may be referred to for detailed explanations of the associated apparatus.

A U.S. Pat. for Crosspoint Switching Array and Control Arrangement Therefor by k. k. Spellnes U.S. Pat. No. 3,288,939, discloses a multistage crosspoint switching network of the type in which there is a plurality of possible paths through the network between any two given terminals at opposite ends of the network, with each stage comprising a plurality of crosspoint matrices, each matrix comprising a plurality of relays arranged in a coordinate array. Each relay has two windings, for operate and hold, respectively, with a diode individual to each relay connected in series with the operate winding between the operate conductors of the horizontal and vertical links. A marker arrangement is provided to test between the operate conductors of the horizontal and vertical links via the relay operate winding and its series diode of one stage at a time. An arrangement is provided to block the test path if the crosspoint being tested is busy, which may for example comprise a busy relay individual to each link having a winding connected to the hold conductor of the link and a normally closed contact set connecting the operate conductor of the link to the marker arrangement, so that for a busy link this busy relay is operated and opens its contacts to thereby open the test path. The marker arrangement includes scanners to test rapidly over several links. The test path provides high resistance such that there is not sufficient current through the operate winding of the crosspoint relays being tested to operate them. Upon selection of a path, a low-resistance connection is made to the operate conductors to cause sufficient current to flow through the operate winding of the selected crosspoint relay to operate it and thereby establish a connection. A hold path at the crosspoint is completed through its hold winding and a contact set in series therewith to the hold conductor path which is completed via the link. The busy relay associated with each link also operates from the hold conductor path to open the contacts in the operate conductors of the link to thereby prevent selection of the crosspoint for another connection.

A U.S Pat. for a Communication Switching System by M. H. Esperseth, F. B. Sikorski, K. K. Spellnes and W. R. Wedmore, Ser. No. 240,497, U.S. Pat. No. 3,275,752, covers a crosspoint switching network comprising switching stages in tandem, with each stage comprising a plurality of crosspoint matrices with a relay at each crosspoint of each stage, and with the operate or pull windings of successive stages connected in series. Each relay has a diode connected in series with its pull winding to prevent sneak paths involving more than one relay per stage. Operate potentials are applied to a selected pair of terminals, one at each end of a given plurality of stages of the network, to operate the relays in a series path through the pull windings of one relay in each stage to establish a connection. In the embodiment disclosed therein the operate path includes up to three stages in series. The stages are arranged so that between any two terminals on opposite sides of the given plurality of stages through which the operate path extends there is a unique path. Each crosspoint relay also has a second winding in series with a normally open set of its own contacts and the stages are also serially connected so that after the relays in the selected path have been operated a hold connection extends in series through the second winding and series contacts of the relays in the path. Cutoff or hold relays in the terminating units may also be connected in series in the hold path.

According to U.S. Pat. No. 3,324,249 to E. Cotroneo et al., a switching network of the type having relay crosspoints with operate and hold windings connected in series through tandem stages as disclosed in U.S. Pat. No. 3,275,752 is provided with a path testing arrangement which takes advantage of the unique path through the series connected stages to test over the operate windings through the tandem stages for an idle path and to establish the connection when a path is found. The connection is then held via the hold windings in series. Each interstage link includes a busy relay having its winding connected in series in the hold winding, and has a normally closed contact set connected in series in the operate winding. Thus, each link which is busy has its busy relay operated to open the operate path. Therefore, when a path including a busy link is scanned, the open contacts in the operate path will block the test path so that the path will not be selected. The terminating unit between the scanner and the adjacent stage of the network also includes a busy relay which operates to open the operate path between the scanner and the network and thereby prevent selection thereof.

SUMMARY OF THE INVENTION

According to the invention, in a system having a unique path arrangement in which there is only one path between any two terminals and having pull interrupt relays, the relays are grouped and then the groups are multiplied to facilitate the operation of the pull interrupt relays of the undesired groups to eliminate all but the potentially usable paths for a particular subscriber terminal.

For a group of 1,000 lines with three switching stages A, B and C, only those BC links have to be considered which correspond to the unique paths available to the group within which the desired terminal is located. This means that the BC links of the remaining nine groups of 100 may have the corresponding pull leads open circuited. To accomplish this, all of the pull interrupt relays, corresponding with each particular group of terminals, are connected together and marked by one signal control lead, coming from the marker. As a result, the application of the negative pull potential, at the inputs of the A matrices of the remaining nine groups of 100 lines cannot affect the selection in the remaining group of 100. In this particular group of 100 lines there are ten subgroups of 10 lines of which only one is of interest, namely, the one to which the subscriber to be serviced is connected. If all the pull interrupt relays between a particular A matrix and the different B matrices are grouped together, each group of 100 terminals has 100 such groups of pull interrupt relays. The equally numbered groups of pull interrupt relays in the different groups of 100 terminals may be multiplied The 10 leads from these groups are connected to the marker, which can then select one of these 10 leads corresponding with the 10-line group to which the subscriber is connected, and apply a potential at the nine remaining leads corresponding to the unwanted groups. This results in all of the pull leads between the A and B matrices being open circuited, except for those which are of interest in the connection to be established.

By operating the pull interrupt relays as explained it becomes possible to multiple all the equally numbered pull lead inputs of all the A matrices in a 1,000-line group, so that only ten control leads per group of 1,000 must be taken from the matrices to the marker, for application of the pull and scanning potential.

BRIEF DESCRIPTION OF THE DRAWING

The novel feature which is believed to be characteristic of the invention, both as to its organization and method of operation, will be more apparent from the following detailed description, taken in conjunction with the accompanying drawings comprising FIGS. 1—4 wherein.

ARRANGEMENT OF LINE GROUP MATRICES

Figures 1, 3:
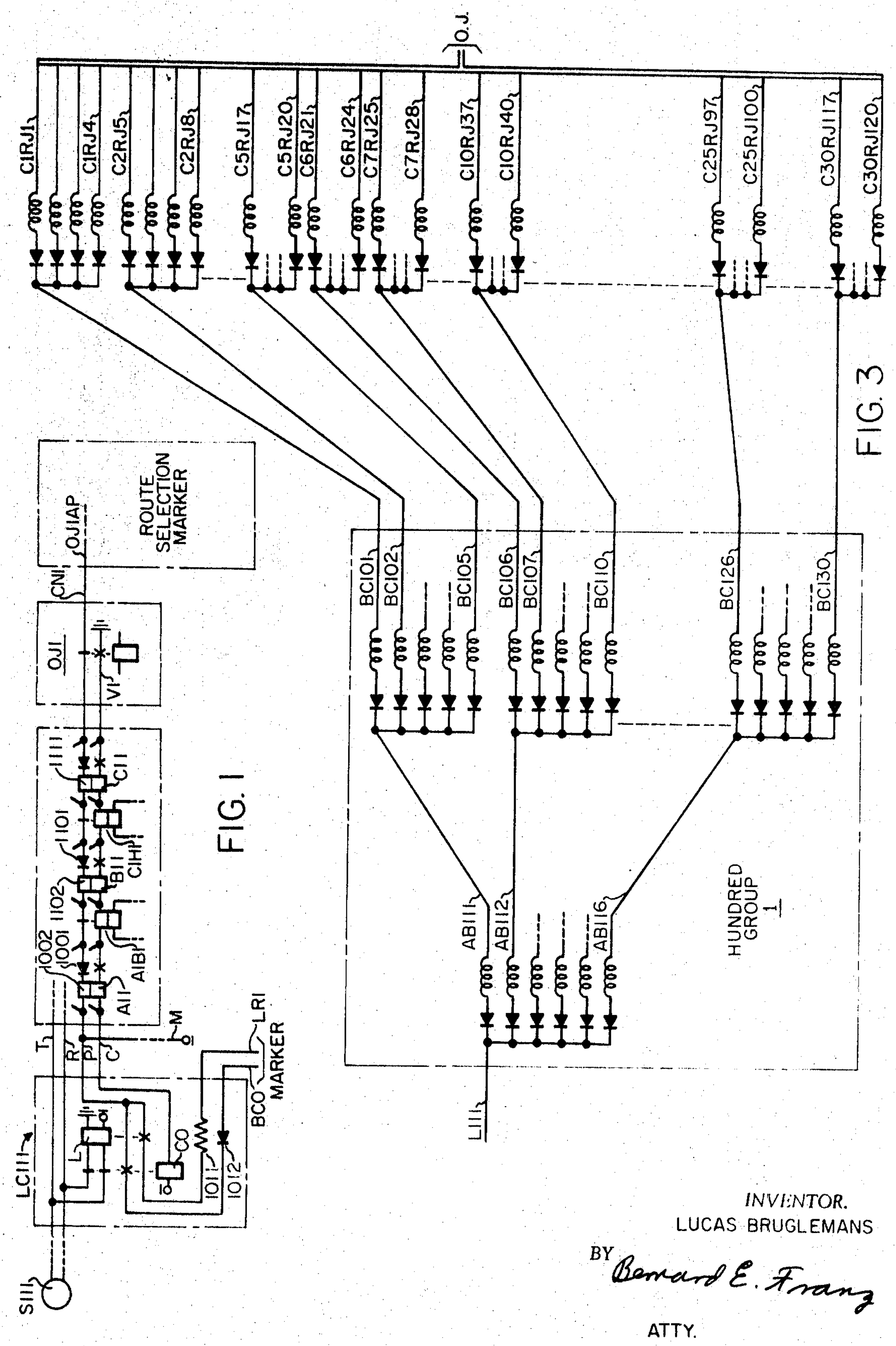
FIG. 1 is a symbolic diagram of a path through the crosspoint network.
FIG. 3 is a symbolic diagram showing the unique path fan-out from a single line terminal.

FIG. 1 shows a single path through the network, for an operate conductor P and a hold conductor C, from a line circuit LC111 through one crosspoint in each of the stages A, B and C of the switching network, then through a junctor OJ1 to a route selector marker. Each crosspoint comprises a two-winding relay, being the operate and hold windings respectively. Each crosspoint includes a diode in series with its operate winding and a normally open set of contacts in series with its hold winding. Each interstage link includes a busy or pull interrupt relay, such as relay A1B1 in the AB link and relay ClHl in the BC link of FIG. 1, each having one winding in series in the hold conductor path and a normally closed set of contacts in series with the operate windings of the crosspoint relays. The junctor OJ1 also includes a relay which operates when the junctor is busy, with a set of make contacts to apply ground potential to the hold conductor and a set of break contacts in series between the switching network and a conductor CN1 to the route selector. The line circuit applies battery potential to the hold conductor C. When the line circuit LC111 is selected for a connection, a negative marking potential from a terminal M is applied through marking circuits, not shown in FIG. 1, to the lead P, and this potential extends through the operate windings and their associated diodes of the network and a plurality of junctors such as OJ1.

Figure 2:
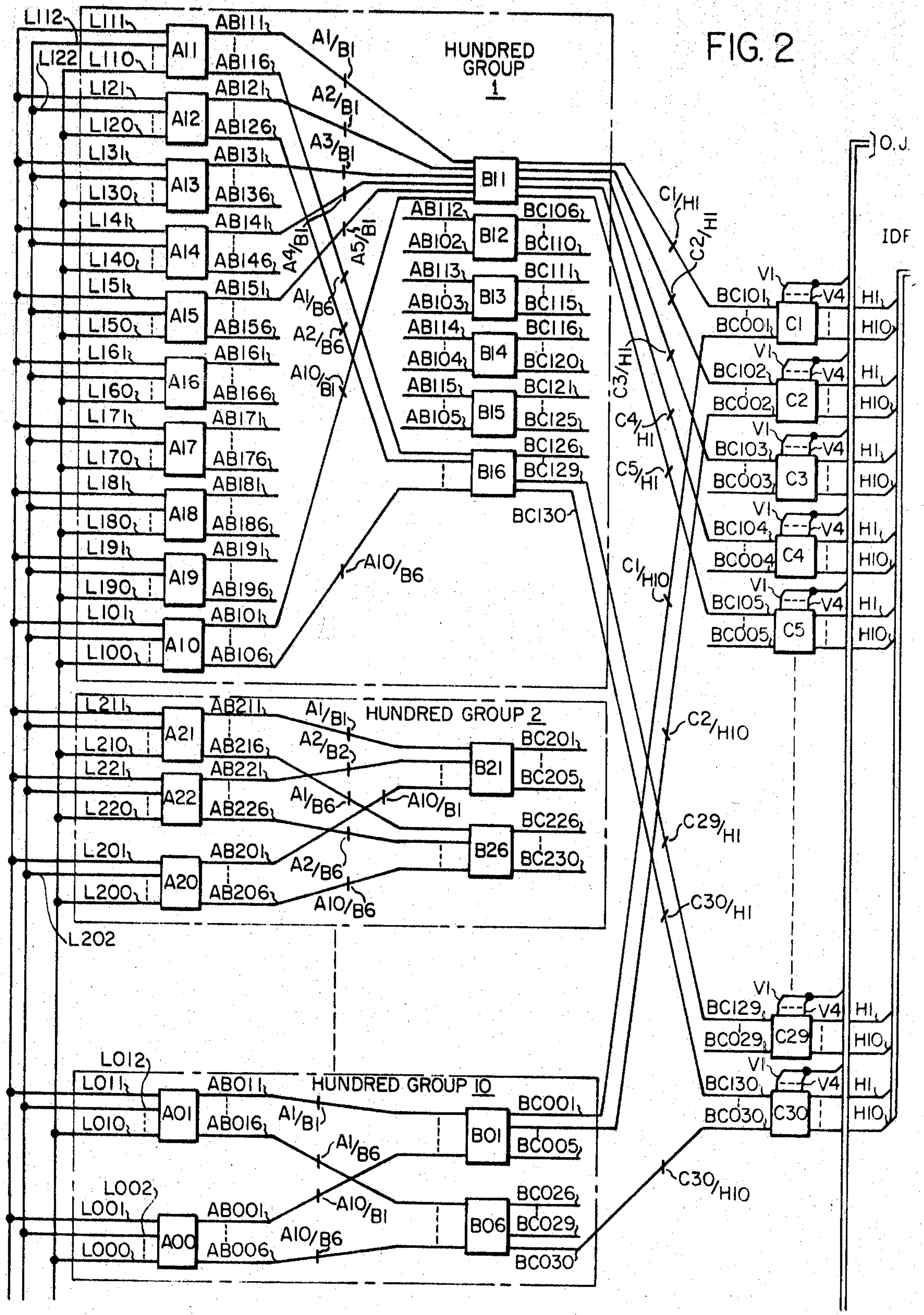
FIG. 2 is a block diagram showing the arrangement of the matrices in the switching network of the line group.

FIG. 2 shows the arrangement and interconnection of the switching matrices and junctors in a line group. The subscriber lines are connected on the horizontal inputs of the A matrices, such that 10 lines are connected at each A matrix. Therefore 10 A matrices are provided for a group of 100 lines. Also for each hundreds group, six B matrices are provided, each B matrix having one input connected to each A matrix. Common to the 10 hundreds groups of 1,000 lines of a line group, there are 30 C matrices. The connections are such that each C matrix has its 10 inputs connected to the 10 different hundreds groups. Thus, since there are six B matrices per hundreds group, the matrix C5 connects to the same B matrices as matrix C1. The 30C matrices are each shown with four vertical outputs, for a total of 120 outputs. The verticals of the C matrices are connected to respective originating junctors, not shown.

All of the matrices are designated by reference characters in which an initial letter designates the switching stage. In the A and B stages the letter is followed by two numbers. The first number indicating the hundreds group and the second letter indicating the matrix within the hundreds groups. Thus in hundreds group one there are 10 A matrices A11—A10 and six B matrices B11—B16. These A and B stages are interconnected by links designated by the letters AB followed by three numbers, in which the first number indicates the hundreds group; the second number indicates the A matrix in the hundreds group and the third number indicates the B matrix in the hundreds group to which the link is connected. Thus link AB111 of the first hundreds group connects card A11 to card B11. The lines from the line circuits to the inputs of the A stage are designated by the letter L followed by three digits, with the first number indicating the hundreds group the second number indicating the A matrix within the hundreds group and the third number indicating the input of the A matrix. Thus lines L111—L110 are connected to the 10 inputs of matrix card A11. In the C stage the matrix cards are designated C1—C30. The links interconnecting the B stages to the C stage are designated by the letters BC followed by three numbers. The first number indicates the hundreds group of the B matrix and the last number indicates the C matrix, with a zero inserted as the center number for connections to cards C1—C9.

Each matrix comprises a plurality of horizontal links and a plurality of vertical links interconnected by crosspoint switches. Each link comprises four conductors, tip T, ring R, control C, and pull P. The tip and ring conductors provide an extension of the subscriber's loop for a talking path, the pull conductor is used to operate the crosspoints, and the control conductor is used to hold the crosspoints in a selected path. Between each horizontal link and each vertical link of a matrix card there is a crosspoint switch comprising three make contacts in three capsules, two windings, and a diode. To establish an originating path after the marker has selected the route, an operate circuit is established on the pull conductor through the three stages in series, through one crosspoint switch in each stage, to operate the crosspoints, then a hold path is established on the C conductor through the three crosspoints to hold the connection. For example as shown in FIG. 1, if a path is to be established from line circuit LC111 to originating junctor OJ1 negative potential is applied to the lead L111P and ground is applied from the route selector marker to conductor OJ1AP of the originating junctor. This causes current to flow in the path through diode 1001 and winding 1002 of matrix A 11, to diode 1101 and he winding 1102 of matrix B 11 and through diode 1111 and winding 1112 of matrix C1, causing the three crosspoint switches to operate in series. The diodes block current flow through undesired paths through other pull windings of each card. To hold the path ground is applied from the originating junctor to the C conductor of the vertical link V1 which extends through the hold windings and their series contacts of of the three crosspoint switches and cutoff relay of line circuit LC111 to negative battery potential.

The line circuit LC111 comprises a line relay L having two windings and a single mark contact, and a cutoff relay C0 having a winding, two break contacts and a make contact. The tip and ring conductors of line L111, which are connected to the subscriber's loop, are also connected to the break contacts of the cutoff relay CO through the windings of the line relay L to ground and negative battery respectively. The hold is connected through the winding of the cutoff relay CO to negative battery. The pull conductor is connected through the make contact of relay L and resistor 1011 to conductor LR1 to the marker; and also through the make contacts of the cutoff relay CO and a diode 1012 to conductor BCO to the marker. The conductors LR1 and BCO are multiplied to all of the one thousand line circuits of the group.

The originating junctor provides connections from the originating path from the C matrices through the junctor and the R matrix to a register junctor, and a line to the IDF for access to an inlet circuit of the group selector. The transmission path (conductors T and R) from the C matrix to the group selector is split in the originating junctor. The incoming path is connected to the register; and the outgoing path to the sender. Switching through of the connection is accomplished by operating a relay under control of the register.

Holding of the preceding switch train by ground on the hold lead is under control of the register junctor before cut through; and under control of the group selector after cut through. The R matrix is released after cut through.

UNIQUE PATH

To better illustrate the unique path arrangement, a fan out of the available paths from a single subscriber terminal on the matrix input has been illustrated in FIG. 3 using the pull lead. The paths from terminal L111 are connected to the horizontal H1 of the A matrix. This horizontal is multiplied to each of the six verticals through the associated diodes and pull windings of the crosspoint relays.

Each of the six vertical output terminals AB111—AB116 of the A matrix are in turn connected to a horizontal input terminal of a different one of the B matrices. Each horizontal of the B matrix is multiplied to each of one of the five verticals through the associated diodes and pull windings of the B matrix crosspoint relays.

Again each output of the five verticals of each of the B matrices is taken to a different one of the C matrices, where the horizontal is multiplied to each one of the four verticals through the associated diodes and pull windings of the C matrix crosspoint relays to the junctors.

From this picture it is apparent that every subscriber terminal on the input of the A matrix has a possible path to every one of the 120 originating junctors. The quantities recited here are intended only for purposes of illustration, though they are used in an actual operating model which, of course, would be different under different traffic conditions.

PULL INTERRUPT RELAY MULTIPLYING

The links interconnecting the line group switching matrices as shown in FIG. 2 each include a break contact. This break contact is associated with a pull interrupt relay, one winding of which is in the series path of the C conductor as shown in FIG. 1.

Figure 4:
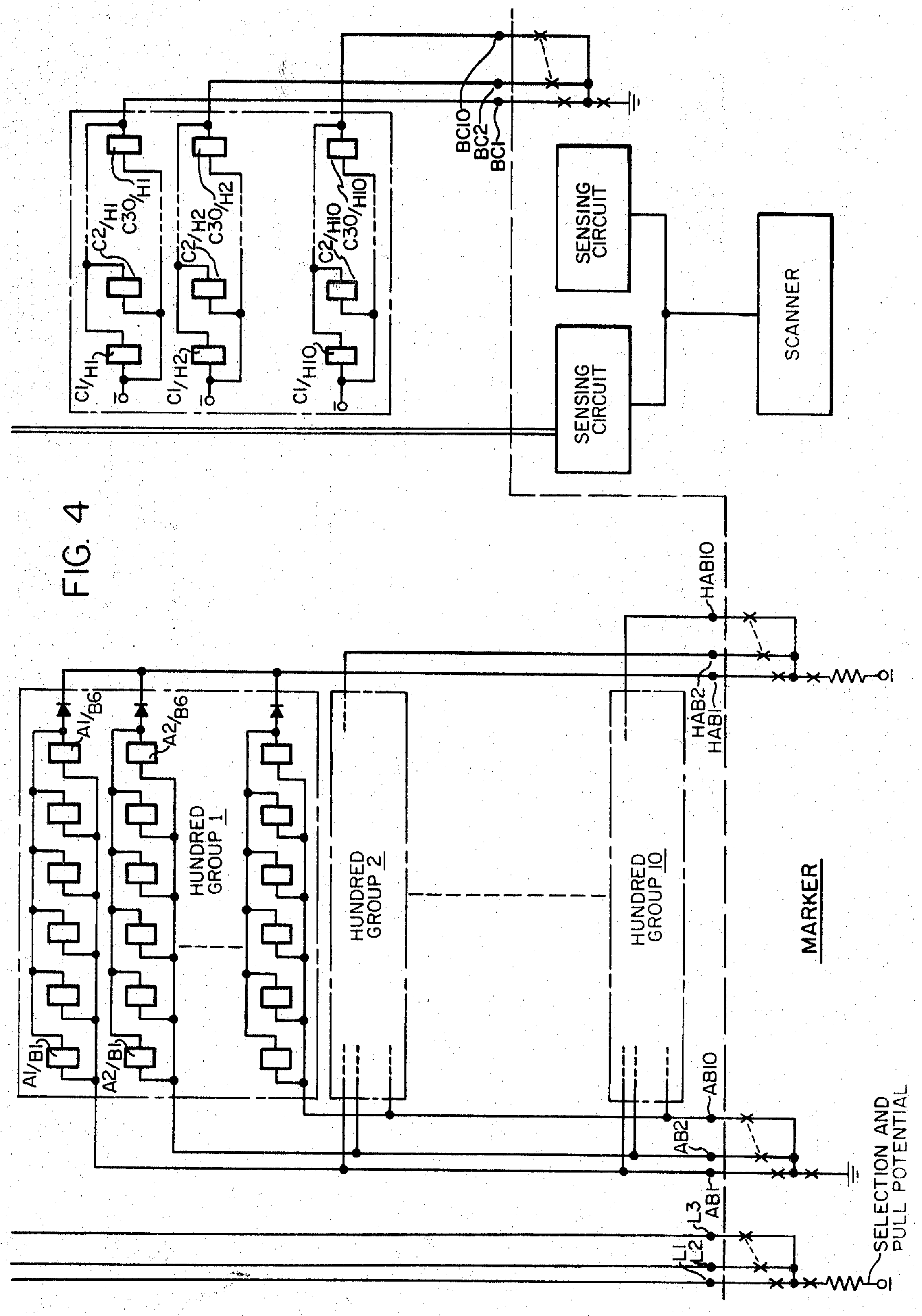
FIG. 4 shows the manner of grouping the pull interrupt relays used in the interstage links and is to be placed below FIG. 2.

Another winding on each of these relays is utilized in the multiplying arrangement of the present invention. For example contact A1/B1 in the link AB111 is associated with relay A1B1 in the hundreds group 1 shown in FIG. 4. This relay is shown wired in parallel with five other relays designated A1B2, A1B3, A1B4, A1B5 and A1B6. These six relays correspond to the six break contacts in the links AB111 through AB1116. Thus for each hundreds group there are 60 such pull interrupt relays with each group of six relays corresponding to a 10 line A matrix group in multiple. One terminal of each group of six relays in each hundreds group is connected through a diode to a common lead for each hundreds group, and designated HAB1 through to HAB10. This lead is then taken to the marker. The other terminal of each group of six relays is then multiplied with a corresponding lead from each of the other hundreds groups and again taken to the marker as leads AB1 through to AB10. The links between the B and C matrices also include break contacts operable by other pull interrupt relays, each also having a pair of windings. The first winding is in the series path of the C conductor and the other winding is connected in parallel with other pull interrupt relays, whereby they may be operated in prewired groups. These groups are arranged to correspond to the BC links from each one hundred line group, in that each of the 30 relays associated with the 30 BC links from a hundreds group are wired together and the common leads are taken to the marker as leads BC1 through to BC10.

This multiplying of the pull interrupt relays as described will upon the application of a group potential to the "AB" lead and a battery potential to the "HAB" lead disable all of the pull leads for a ten line group. Now, if these potentials are applied to all of the "AB" leads except that particular lead corresponding to a group having a line requesting service, the selection on the line terminal side need only be made among the lines within a 10 line group.

Since the "AB" link pull interrupt relays are multiplied at the "HAB" lead side in 100 line groups and at the "AB" lead side in 10 line groups, it becomes apparent that the 10 line group within each 100 line group is capable of completing a pull operate path. To prevent this the BC links corresponding to the undesired line groups must be interrupted, which is accomplished by applying a potential to all of the "BC" leads from the marker except the one corresponding to the hundreds group of the line requesting service.

To complete the selection it is now necessary to select the particular line within the ten line group, and since this is the only selection after the operation of the pull interrupt relays it is advantageous to multiple the correspondingly numbered lines of each 10 line group in all of the hundreds groups, resulting in only 10 leads to the marker for a 10,000 line group.

It will be apparent that applicant has provided an improved grouping arrangement for simplifying the cabling requirement and at the same time simplifying the operation required of the marker equipment for a given size matrix.

While the use of a particular arrangement of the pull interrupt relays has been disclosed, it is of course apparent that other combinations are possible and perhaps more desirable under different circumstances.

The described example results in the connection of only 40 leads to the marker for the control of the marking and operation of the pull interrupt relays.

Another configuration within the basic concepts here disclosed would be the use of 100 leads to the marker from the A matrix inputs, retaining the 20 leads to the AB link pull interrupt relay and eliminating the 10 leads of the BC link pull interrupt relays.

Various changes and alternative implementations will now occur to those skilled in the art without departing from the true spirit and scope of the invention. Accordingly, it is not intended that the invention be limited to that which has been particularly shown and described, except as such limitations appear in the appended claims.

I claim:

1. An automatic communication switching system for extending connections from a first set of terminals to a second set of terminals through a plurality of serially linked coordinate matrices arranged in stages, said inter-matrix links so arranged as to form one and only one unique path including one crosspoint of each serial matrix between any terminal of said first set and any terminal of said second set, marking means for controlling the extension of connections through said matrices, said first set of terminals being grouped into subsets of N terminals with every Nth corresponding terminal multiplied together and to said marking means, path interrupt means and path interrupt operate means in said interstage links, said interrupt means of a particular interstage group being multiplied together into first groupings corresponding to said links availability in said unique path to each of said subsets of terminals, and said marking means operated responsive to the requirements of extending a connection from a particular terminal of said first sets to connect a first potential to said subset multiple within which said particular terminal is to be found, to apply operating potentials to all of said path interrupt operate means except said multiple groups corresponding to the links available for said unique path of the subset within which said particular terminal is found, and scanning means thereafter operated to scan said second set of terminals for an available path thereto whereby upon finding an available one of said second set of terminals the application of a second potential thereto will operate said crosspoints of each serial matrix to connect said two sets of terminals.

2. In a system in accordance with claim 1, wherein said plurality of switching stages includes at least three switching stages arranged in tandem, each of said stages comprising a plurality of relays arranged in a plurality of coordinate matrices, each relay having an operate winding and a unidirectional device connected in series, at the coordinate points of each of said matrices; the first two of said switching stages being arranged in groups, each group comprising a plurality of said coordinate matrices in the first stage and a plurality of coordinate matrices in the second stage arranged with first-to-second stage links extending from outlets of the first-stage matrices to inlets of the second-stage matrices with each outlet of any first-stage matrix connected to an inlet of a different second stage matrix; the third of said switching stages being arranged in groups of matrices with second-to-third stage links interconnecting outlets of the first-second stage groups to the inlets of the third-stage groups with each outlet of any first-second stage group connected to an inlet of a different third-stage group; to thereby form one and only one path including one coordinate point relay of each stage between any terminal of said first and any terminal of said second set; each of said links having a plurality of conductors including an operate conductor and a hold conductor; a pull interrupt relay individual to each interstage link having a first and a second winding, said first winding in series in the hold conductor of its link, and a normally closed contact set in series in the operate conductor; the the improvement comprising the multiplying of said first set of terminals by connecting each of the first N of said terminals to every Nth one of the succeeding terminals and to a selection means, the pull interrupt relays of the first-to-second stage links corresponding to each one of said first coordinate matrices connected together into a first group having a first and a second common lead for operation thereof and then each of said first groups within a first-to-second stage matrix group having said second terminals further multiplied to a group common conductor corresponding to said matrix group, said first common conductor further multiplied to like numbered conductors of said other first-to-second stage interrupt relay groups and to a selection means, the pull interrupt relays of said second-to-third stage links connected together into third groups corresponding to said first and second stage matrix groups, said selection means being operated to place a first potential upon one of said N first terminal multiples, and apply a first potential to all of said first group common conductors except that one within which said marked first terminal has an appearance, and apply a second potential to that one of said group common conductors within which said marked first terminal has an appearance, and apply another potential to all of said third group multiple leads except that one corresponding to said group within which said marked first terminal has an appearance, the contacts of said pull interrupt relays in the links operated to the open condition being effective to prevent selection of these links by said scanning means for the establishment of a connection; means to idle test said remaining links, means to select a terminal of the second set at the ends of a path having the first-second stage link and the second-third stage link idle to apply a second marking potential to said selected terminal of the second set which produces a potential difference in the forward direction of said devices between the two selected terminals through a series path including the operate winding and unidirectional device of one coordinate point relay of each of said stages, which causes said relays in the path between the selected terminals to operate and thereby establish a communication path; the only potentials applied to said series path to establish a connection being the potentials applied to said selected terminals.

3. In a system in accordance with claim 2 wherein said quantity N is equal to ten.

4. In a system in accordance with claim 1, wherein said plurality of switching stages includes at least three switching stages arranged in tandem, each of said stages comprising a plurality of relays arranged in a plurality of coordinate matrices, each relay having an operate winding and a unidirectional device connected in series, at the coordinate points of each of said matrices; the first two of said switching stages being arranged in groups, each group comprising a plurality of said coordinate matrices in the first stage and a plurality of coordinate matrices in the second stage arranged with first-to-second stage links extending from outlets of the first-stage matrices to inlets of the second-stage matrices with each outlet of any first-stage matrix connected to an inlet of a different second stage matrix; the third of said switching stages being arranged in groups of matrices with second-to-third stage links interconnecting outlets of the first-second stage groups to the inlets of the third stage groups with each outlet of any first-second stage group connected to an inlet of a different third-stage group; to thereby form one and only one path including one coordinate point relay of each stage between any terminal of said first and any terminal of said second set; each of said links having a plurality of conductors including an operate conductor and a hold conductor; a pull interrupt relay individual to each first-to-second interstage link having a first and a second winding, said first winding in series in the hold conductor of its link, and a normally closed contact set in series in the operate conductor;

the improvement comprising the multiplying of said first set of terminals by connecting each of the first 100 of said terminals to every one hundredth one of the succeeding terminals and to a selection means, the pull interrupt relays of the first-to-second stage links corresponding to each one of said first coordinate matrices connected together into a first group having a first and a second common lead for operation thereof and then each of said first groups within a first-to-second stage matrix group having said second terminals further multiplied to a group common conductor corresponding to said matrix group, said first common conductor further multiplied to like numbered conductors of said other first-to-second stage interrupt relay groups and to a selection means, said selection means being operated to place a first potential upon one of said 100 first terminal multiples, and apply a first potential to all of said first group common conductors except that one within which said marked first terminal has an appearance, and apply a second potential to that one of said group common conductors within which said marked first terminal has an appearance, the contacts of said pull interrupt relays in the links operated to the open condition being effective to prevent selection of these links by said scanning means for the establishment of a connection; means to idle test said remaining links, means to select a terminal of the second set at the ends of a path having the first-second stage link and the second-third stage link idle to apply a second marking potential to said selected terminal of the second set which produces a potential difference in the forward direction of said devices between the two selected terminals through a series path including the operate winding and unidirectional device of one coordinate point relay of each of said stages, which causes said relays in the path between the selected terminals to operate and thereby establish a communication path; the only potentials applied to said series path to establish a connection being the potentials applied to said selected terminals.